(No Model.)

J. P. SMITH.
FISH TRAP.

No. 356,797. Patented Feb. 1, 1887.

Witnesses
Jos. S. Latimer
J. S. Brown.

Inventor
John P. Smith
By his Attorney
Arthur S. Browne

UNITED STATES PATENT OFFICE.

JOHN P. SMITH, OF EXETER, NEW HAMPSHIRE, ASSIGNOR OF ONE-HALF TO FRANK J. BROWNE, OF SAME PLACE, AND HERBERT J. BROWNE, OF WASHINGTON, DISTRICT OF COLUMBIA.

FISH-TRAP.

SPECIFICATION forming part of Letters Patent No. 356,797, dated February 1, 1887.

Application filed November 26, 1886. Serial No. 219,957. (No model.)

*To all whom it may concern:*

Be it known that I, JOHN P. SMITH, a citizen of the United States, residing at Exeter, in the county of Rockingham and State of New Hampshire, have invented certain new and useful Improvements in Fish-Traps; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1:
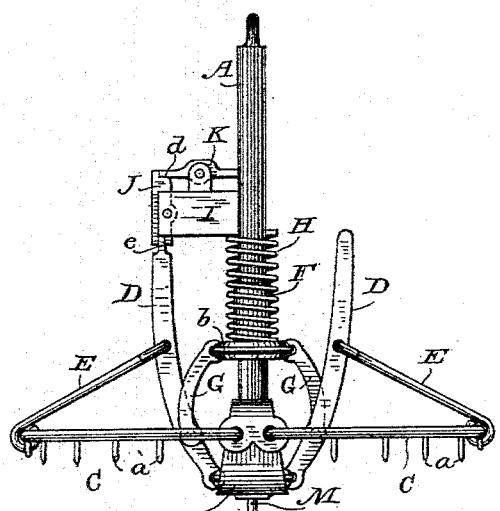
Figure 2:
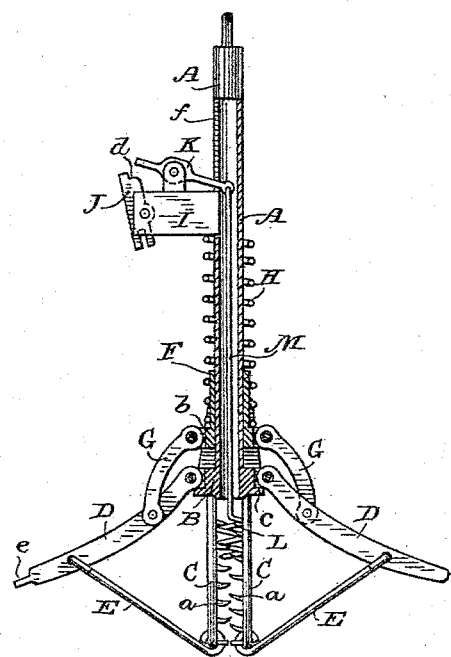
Figure 3:
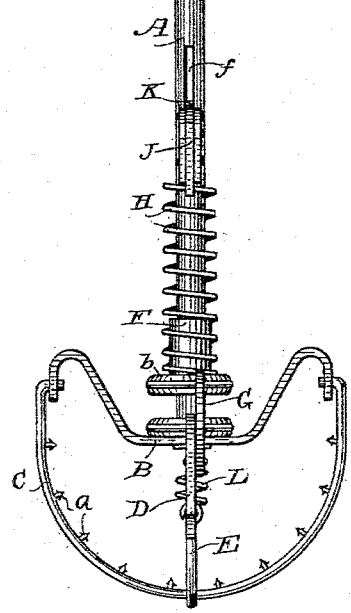

In the drawings, Figure 1 is a front view of the trap, showing it set. Fig. 2 is a central vertical section showing the trap closed. Fig. 3 is a side view, also showing the trap closed.

This trap is designed particularly for catching fish; and to that end it consists in two jaws provided with sharp teeth, which are adapted to automatically close and catch the head of the fish when the bait is seized.

The trap is supported by a hollow bar, A, which is adapted to be attached to a fishing-line. To the lower end of this rod is secured a cross-bar, B, to the outer ends of which are pivoted the two jaws C C. These jaws are each semicircular in shape, and each jaw carries a series of sharp-pointed teeth, $a\,a$, which are located on the under side of each jaw throughout its entire extent. These teeth may be either straight, curved, plain, or provided with barbed points, as illustrated in the different figures. Pivoted to the lower end of the bar A, on opposite sides thereof, are two levers, D D, which are respectively connected to the center of each jaw by rods E E.

A sliding tubular collar, F, formed with a flange, $b$, fits over and slides upon the bar A. This collar is connected to the levers D D by links G G, which are pivoted at opposite ends to the flange $b$, and to the levers between the points where said levers are pivoted to the bar A, and connected to the rods E E.

Between a flange, $c$, fixed to the bar A, and the flange $b$ on the sliding collar is located a strong coiled spring, H, surrounding the bar A. When the collar F is at its highest position the spring H is compresssed, and the jaws are held up as shown in Fig. 1, and in this position the jaws are set when the trap is to be used; but on releasing the jaws they are pushed forcibly downward toward each other by the force of the coiled spring into the position shown in Figs. 2 and 3.

The jaws are held in their uppermost or set position by the following mechanism: Rigidly secured to the bar A is a laterally-extending arm, I, to the outer end of which is pivoted a trip-catch, J. This catch has an open notch, $d$, in which is held a projection, $e$, on the upper end of one of the levers D. This catch is pivoted to turn in a vertical plane, and it is prevented from turning by engaging with the end of a horizontal tripping-lever, K, which is pivoted to a bracket on the upper side of the arm I.

The trencher L, which may be either an ordinary hook or a screw, as shown in the drawings, is secured to a rod, M, which is located within the hollow bar A. The upper end of this rod is connected to the inner end of the tripping-lever K, which extends through a slot, $f$, in one side of the hollow bar A. The trencher is preferably a screw, as shown in Fig. 1, since the screw holds the bait more securely. When the trap is set, as in Fig. 1, and a fish takes hold of the bait on the trencher L and attempts to pull upon it, the rod M is pulled downward, thus lifting the outer end of the trip-lever K. This moving of the trip-lever disengages it from the trip-catch J, which is thus free to turn on its pivot and release the jaw-lever D. The jaws are then shut by the spring H, and the sharp teeth $a\,a$ are forced into the head of the fish.

This trap, though designed more especially for the catching of fish, may be equally well used for catching small game.

I claim as my invention—

1. A hollow bar and a pair of spring-actuated jaws pivoted on opposite sides of said bar so as to turn toward each other, in combination with a catch carried by said bar and engaging said jaws to hold the same in their set position, and a trencher-rod located within said hollow bar and connected to said catch, substantially as set forth.

2. A central bar, a cross-bar secured to the lower end of said central bar, jaws pivoted to said cross-bar, levers pivoted to said central bar, and rods connecting said levers to the center of each jaw, in combination with a sliding collar embracing and sliding on said central bar, and pivoted links connecting said collar to said levers, substantially as set forth.

3. A central bar, A, a cross-bar, B, secured to the lower end thereof, two semicircular jaws, C C, pivoted by their ends to said cross-bar, said jaws being provided with sharp-pointed teeth a a, levers D D, pivoted to the central bar, and rods E E, connecting said levers to the center of each jaw, in combination with a sliding collar, F, embracing and sliding on said central bar, pivoted links G G, connecting said collar to said levers, said links being pivoted to the levers between the points where the latter are pivoted to the central bar and connected to the jaw-rods, and a coiled spring, H, surrounding the central bar and located between a fixed stop on the central bar and said sliding collar, substantially as set forth.

4. The central hollow bar, the spring-actuated jaws carried thereby, and the levers connected to said jaws, in combination with the trip-catch which engages one of said levers, the tripping-lever which engages the catch at one end and passes through a slot in the central bar at its other end, and a trencher-rod located within said hollow bar and connected to the inner end of said tripping-lever, substantially as set forth.

In testimony whereof I affix my signature in presence of two witnesses.

JOHN P. SMITH.

Witnesses:
WILLIAM P. MOULTON,
EDWARD FORD.